United States Patent
Lei et al.

(10) Patent No.: US 9,838,518 B2
(45) Date of Patent: Dec. 5, 2017

(54) MOBILE DEVICE WITH DISPLAY WRAPPING AROUND SURFACES

(71) Applicant: Xiaomi Inc., Beijing (CN)

(72) Inventors: Jun Lei, Beijing (CN); Yuan Gao, Beijing (CN); Gaocai Han, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/056,405

(22) Filed: Feb. 29, 2016

(65) Prior Publication Data

US 2016/0381194 A1    Dec. 29, 2016

(30) Foreign Application Priority Data

Jun. 25, 2015 (CN) .......................... 2015 1 0359811

(51) Int. Cl.
*H04M 1/02* (2006.01)
*G06F 1/16* (2006.01)

(52) U.S. Cl.
CPC ........ *H04M 1/0268* (2013.01); *G06F 1/1652* (2013.01); *H04M 1/0266* (2013.01); *G06F 1/1647* (2013.01); *H04M 2250/16* (2013.01)

(58) Field of Classification Search
CPC ............ H04M 1/0268; H04M 1/0266; H04M 2250/16; G06F 1/1652; G06F 1/1647
See application file for complete search history.

(56) References Cited

U.S. PATENT DOCUMENTS

| | | | |
|---|---|---|---|
| 2002/0196205 A1 | 12/2002 | Yamakado et al. | |
| 2009/0270142 A1 | 10/2009 | Liang | |
| 2010/0117975 A1* | 5/2010 | Cho | G06F 1/1626 345/173 |
| 2010/0216514 A1* | 8/2010 | Smoyer | G06F 1/1647 455/566 |
| 2011/0164047 A1* | 7/2011 | Pance | G06F 1/1647 345/581 |
| 2011/0261002 A1 | 10/2011 | Verthein | |
| 2012/0243151 A1 | 9/2012 | Lynch | |

(Continued)

FOREIGN PATENT DOCUMENTS

| | | |
|---|---|---|
| CN | 2523132 Y | 11/2002 |
| CN | 201628881 U | 11/2010 |

(Continued)

OTHER PUBLICATIONS

Russian Office Action (including English translation) issued in corresponding RU Application No. 2015150720/08(078065), dated Sep. 3, 2017, 10 pgs.

(Continued)

*Primary Examiner* — Daniel Lai (57) ABSTRACT

The disclosure relates to a mobile device including a frame assembly with an accommodating space formed therein for disposing functional parts of the mobile device, and a primary display module disposed on an outer side of the frame assembly. The primary display module wraps around a front surface, a back surface, and side surfaces of the mobile device. By the solution of the disclosure, a full-screen mobile device is achieved so that the user may enjoy completely new experience by way of greater display area.

14 Claims, 5 Drawing Sheets

(56) References Cited

U.S. PATENT DOCUMENTS

| | | | | |
|---|---|---|---|---|
| 2013/0076612 | A1* | 3/2013 | Myers | G06F 1/1626 |
| | | | | 345/156 |
| 2014/0310643 | A1* | 10/2014 | Karmanenko | G06F 1/1626 |
| | | | | 715/784 |
| 2016/0170100 | A1* | 6/2016 | Wang | G02B 5/04 |
| | | | | 600/301 |

FOREIGN PATENT DOCUMENTS

| | | |
|---|---|---|
| CN | 102004614 A | 4/2011 |
| CN | 102209128 A | 10/2011 |
| CN | 104460089 A | 3/2015 |
| EP | 2192750 A2 | 6/2010 |
| JP | 11017579 A | 1/1999 |
| JP | 2003076274 A | 3/2003 |
| JP | 3189115 U | 2/2014 |
| JP | 2015512170 A | 4/2015 |
| KR | 20100052227 A | 5/2010 |
| KR | 102014004593 A | 4/2014 |
| KR | 20140094930 A | 7/2014 |
| KR | 1020150003380 A | 1/2015 |
| RU | 2013153390 A | 6/2015 |
| WO | 2015079361 A1 | 6/2015 |

OTHER PUBLICATIONS

Office Action for Korean application No. 2015-7033026 dated Apr. 27, 2017, 6 pages.

European Search Report issued in corresponding EP Application No. 16 17 4247, dated Dec. 9, 2016, 8 pgs.

Korean Office Action (including English translation) issued in corresponding KR Application No. 10-2015-7033026, dated Feb. 28, 2017, 8 pgs.

International Search Report (including English translation), issued in corresponding International Application No. PCT/CN2015/090295, dated Mar. 15, 2016, 4 pgs.

Office Action for Japanese Application No. 2017-524086 dated Sep. 5, 2017, 6 pages.

* cited by examiner

MOBILE DEVICE WITH DISPLAY WRAPPING AROUND SURFACES

CROSS-REFERENCE TO RELATED APPLICATIONS

This application claims priority to Chinese application No. 201510359811.5, filed Jun. 25, 2015, the entire contents of which are incorporated herein by reference.

TECHNICAL FIELD

The disclosure relates to a field of mobile devices, and more specifically to mobile devices and housing structures for mobile devices.

BACKGROUND

With development of Internet, smart phones, tablets, or mobile devices of other types, are increasingly becoming important tools indispensable in people's daily life. At present, the screen sizes of mobile devices are becoming larger and larger, so that users may get better visual experience; however, at the same time, increasing of the screen sizes is actually limited by specifications for mobile devices, in order to avoid negative impact of oversized devices on portability and convenience of the mobile devices.

SUMMARY

According to a first aspect of the disclosure, a mobile device is provided. The mobile device includes: a frame assembly with an accommodating space formed therein for disposing functional parts of the mobile device; and a primary display (screen) module disposed on an outer side of the frame assembly. The primary display wraps around a front surface, a back surface, and side surfaces of the mobile device.

According to a second aspect of the disclosure, a housing structure is provided. The housing structure includes a frame assembly including circuitry parts disposed thereon. The housing structure further includes a primary display module and an auxiliary display module. The primary display module is disposed on an outer side the frame assembly, where the primary display module wraps around the frame assembly. The auxiliary display module is disposed on at least one end face of the frame assembly.

It is intended that the foregoing and the following detailed description be understood only as an illustration of selected forms that the invention can take and not as a definition of the invention. It is only the claims, including all equivalents, that are intended to define the scope of this invention.

BRIEF DESCRIPTION OF THE DRAWINGS

The accompanying drawings, which are incorporated in and constitute a part of this application, illustrate embodiments of the invention and serve to explain the principle of the invention together with the description.

DETAILED DESCRIPTION

Hereinafter, embodiments will be explained with reference to the accompanying drawings. In the drawings, unless otherwise indicated, identical or similar elements may be denoted by same reference numeral. Implementations of the exemplary embodiments described below are not intended to exclusively include all implementations of the disclosure. Instead, they are merely examples of devices and methods which are consistent with those defined in the claims and some aspects of the disclosure.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Figure 1:
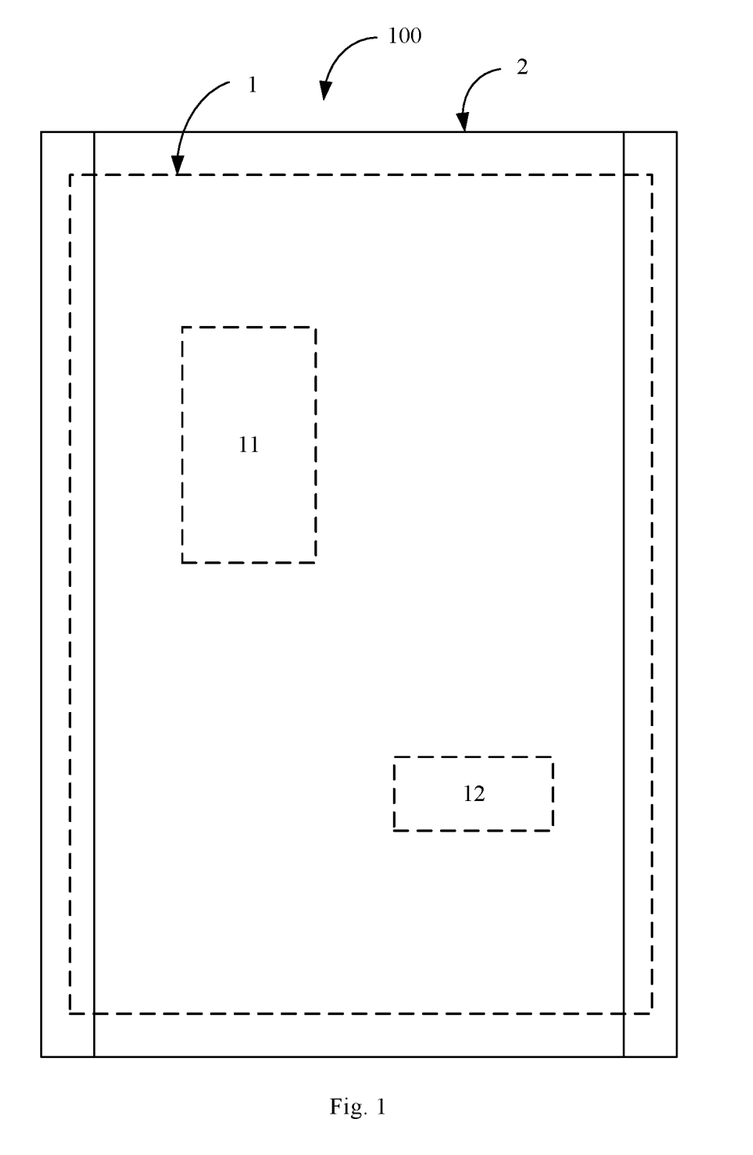
FIG. 1 is a front view of a mobile device according to an exemplary embodiment.

FIG. 1 is a front view of a mobile device 100 according to exemplary embodiments. As shown in FIG. 1, the mobile device 100 may include: a frame assembly 1 and a primary display module 2. The frame assembly 1 includes an accommodating space for disposing functional parts 11 and 12 of the mobile device (not shown). The primary display module 2 is disposed on an outer side of the frame assembly 1. The primary display module 2 wraps around a front surface, a back surface, and side surfaces of the mobile device. The primary display module 2 may include any type of flexible display including: organic light-emitting diode (OLED), Polymer light-emitting diodes (PLED), electronic paper, etc. Alternatively, the primary display module 2 may include a combination of flexible display and flat display. The material of the display module 2 is not limited by the above examples.

In the embodiments, the frame assembly 1 may include a frame structure and the like of the mobile device. On the one hand, functional hardware parts such as a mainboard and battery/batteries can be placed in the frame assembly, so as to avoid external shock. The functional hardware parts may further include one or more circuitry parts. Alternatively or additionally, the frame assembly may mechanically support the primary display module 2 and the like on an outer side, so as to provide a higher strength for the primary display module 2 and the entire mobile device.

In the embodiments, since the front surface, the back surface, and the side surface of the mobile device are simultaneously covered by the primary display module 2, compared to the mobile device of the related art which has only its front surface provided with the display, a dimension of the primary display module 2 may break limitation of the dimension of the front surface of the mobile device, in order to greatly increase the display area of the primary display module 2. Moreover, through cooperative displays of a plurality of surfaces, such as the front surface, the back surface, and the side surfaces, compared to display of only the front surface according to the related art, the user could enjoy completely different visual effect and experience.

The primary display module 2 may have different structures and may be implemented in different ways. The primary display module 2 may include one or more control circuitry to drive the display module. The one or more control circuitry may be connected to the frame assembly 1, which transmit display data to the display module 2. Among them, several possible embodiments will be described below, and of course, the disclosure is not limited thereto.

Figure 2A:
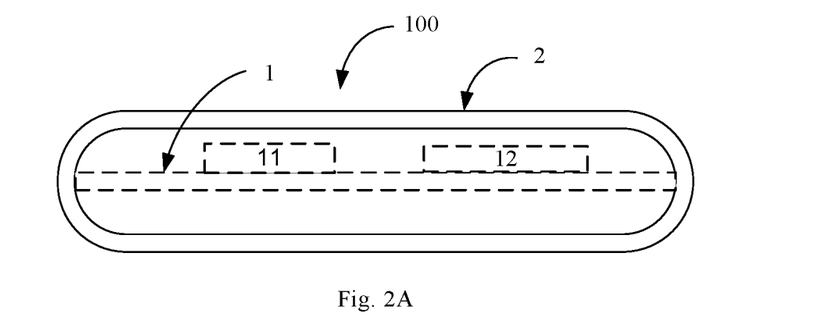
FIG. 2A is a top view of a mobile device according to an exemplary embodiment.
Figure 2B:
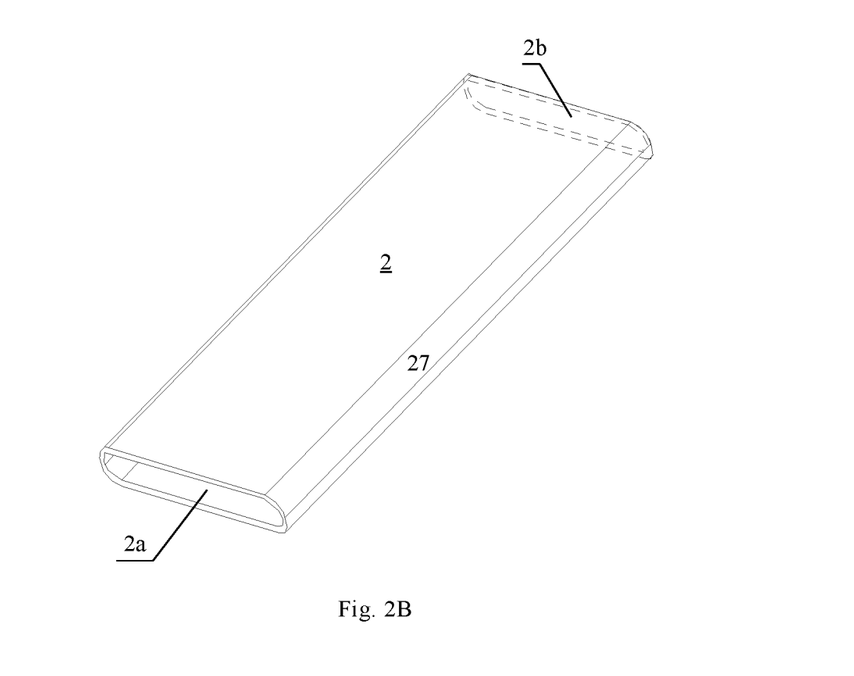
FIG. 2B is a perspective view of a display housing structure according to an exemplary embodiment.

FIG. 2A is a top view of a mobile device according to exemplary embodiments. FIG. 2B is a perspective view of a display housing structure according to an exemplary embodiment. As shown in FIG. 2A and FIG. 2B, the primary display module 2 may be a display module having an integrated display structure including one or more curved portions 27. For example, the primary display module 2 may include a partially closed display structure without any joint. The partially closed structure may include one or two end openings 2a and 2b such that assembling of the mobile device can be completed after the frame assembly 1 and the functional parts 11 and 12 in the assembly are inserted from any end opening 2a or 2b of the primary display module 2. Note that the number of functional parts may vary and the specific shapes and locations of the functional parts are not limited. As shown in FIG. 2A, the primary display module 2 is seamless.

In the embodiments, the primary display module 2 may be integrated in any of the front surface, the back surface, and the side surface of the mobile device, so that display contents can be fully and continuously displayed on these surfaces, to maximize the advantages of a multiple-surface-display, and improve the user's experience. The mobile device may include a sensor to detect which side of the display module 2 is facing the user so that the user can operate a first plurality of applications in the front surface and a second plurality of applications in the back surface when either the front surface or the back surface is facing up to the user. In addition, the mobile device may display a third plurality of applications in the side surface. The multiple surfaces in the display module 2 may work independently or cooperatively in different applications.

Figure 3:
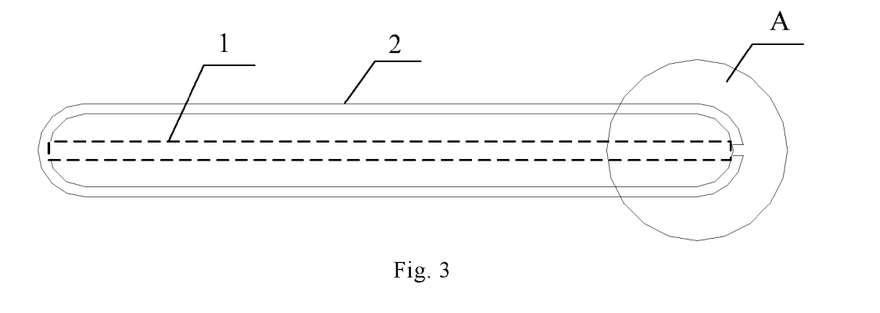
FIG. 3 is a top view another mobile device according to an exemplary embodiment.

FIG. 3 is a top view of a mobile device according to exemplary embodiments. As shown in FIG. 3, the primary display module 2 may be a display module having an integrated flexible flat structure. In other words, the primary display module 2 itself has a flexible flat structure. The flexible flat structure is wrapped over the outer side of the frame assembly 1 according to an external wall structure of the frame assembly 1, such that edges on both sides of the primary display module 2 are connected to each other to form a partially closed structure, so as to form the final mobile device.

Alternatively or additionally, assembling of the mobile device may be performed by inserting the frame assembly 1 and functional parts in the frame assembly from any end opening of the partially closed structure after the corresponding partially closed structure is formed in advance by the primary display module 2 in accordance with the specifications of the frame assembly 1. Of course, the disclosure does not limit the way of assembling the mobile device as long as the mobile device having the structure shown in FIG. 1 may be achieved.

Figure 4:
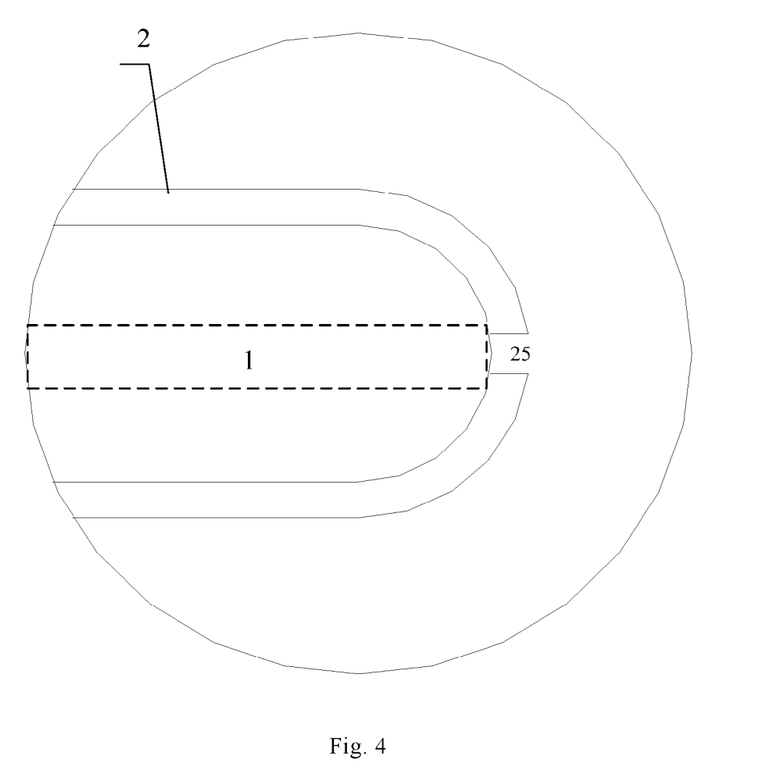
FIG. 4 is an enlarged view of a portion A of the mobile device of the embodiment shown in FIG. 3.

FIG. 4 is an enlarged view of a portion A of the mobile device of the embodiment shown in FIG. 3. As shown in FIG. 4, a connection gap 25 between the edges on the two sides of the primary display module 2 is located on right side of the mobile device, in order to provide advantageous effect of maintaining display continuity of the front and back surfaces which have largest areas, and reduce a visual impression of the connection gap 25. Of course, the connection gap may be located on any position of the mobile device, for example, the connection gap 25 may be located on left side, front side, or back side of the mobile device, the disclosure does not have limitation to specific locations of connection gap 25 on the mobile device. Note that the connection gap 25 does not exist in the primary display module 2 in FIG. 2A. Here, the connection gap 25 may be configured to accommodate speaker and/or microphones of the mobile device.

Figure 5:
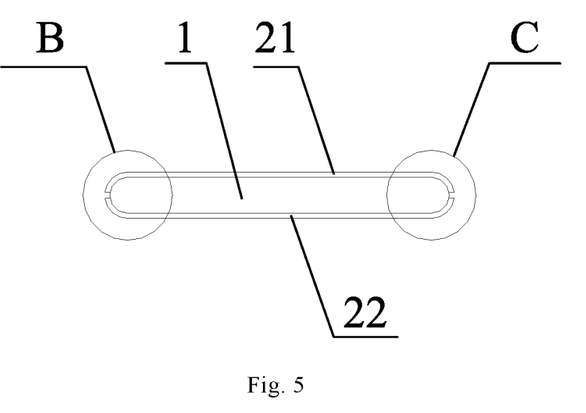
FIG. 5 is a top view of a mobile device according to an exemplary embodiment.

FIG. 5 is a top view of a mobile device according to exemplary embodiments. As shown in FIG. 5, the primary display module 2 shown in FIG. 1 may include a first flexible display module 21 and a second flexible display module 22. In other words, each of the first flexible display module 21 and the second flexible display module 22 has a flat structure. When the primary display module 2 is mounted in the mobile device, the first flexible display module 21 and the second flexible display module 22 are wrapped on an outer side the frame assembly 1 according to an external wall structure of the frame assembly 1, such that ends of the first flexible display module 21 are connected to ends of the second flexible display module 22 to form a partially closed structure, and the final mobile device is produced.

Alternatively or additionally, assembling of the mobile device may be performed by inserting the frame assembly 1 and its functional hardware parts from any end opening of the partially closed structure after the first flexible display module 21 and the second flexible display module 22 enclose the partially closed structure matched with each other in accordance with the dimensions of the frame assembly 1. Of course, the disclosure does not limit the way of assembling the mobile device as long as the mobile device having the structure shown in FIG. 1 may be achieved.

Figure 6:
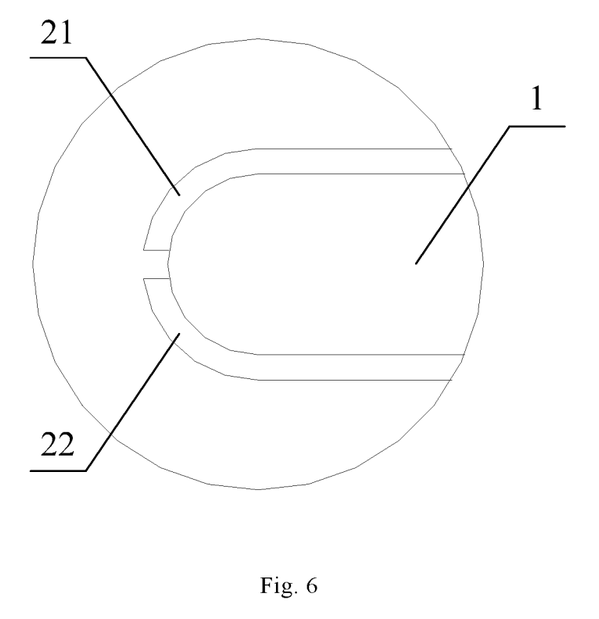
FIG. 6 is an enlarged view of a portion B of the mobile device of the embodiment shown in FIG. 5.

In the embodiments, corresponding connection gaps may be formed between the first flexible display module 21 and the second flexible display module 22. For example, the connection gaps may be located at portions B and C shown in FIG. 5, that is, both of the connection gaps may be located at side surfaces of the mobile device. Accordingly, FIG. 6 shows an enlarged view of the portion B in FIG. 5, the corresponding connection gap may be clearly viewed therefrom. The portion C is similar to the portion B, and its illustration will not be redundantly repeated.

The display continuity of the front surface and the back surface may be advantageously maximized, and the visual impression of the connection gap may be advantageously reduced when the connection gaps are located at the side surface of the mobile device. Of course, the connection gap may be located at any position on the mobile device. For example, additional to the side surface, the connection gap may be located at the front surface, the back surface, or other surface of the mobile device, the disclosure does not limit location of the connection gap.

In addition, based on any of the above embodiments, the mobile device may further include an auxiliary display module. The auxiliary display module may be attached to at least one of a top end face and a bottom end face of the mobile device, and forms a closed structure in cooperation with the primary display module 2. The primary display module 2 and the auxiliary display module cooperate and fully cover the mobile device. In the embodiments, all of the end faces of the mobile device may be used as displays by adding the auxiliary display module, thereby to expand the display area to a maximum extent, and achieve a full-screen mobile device.

Figure 7:
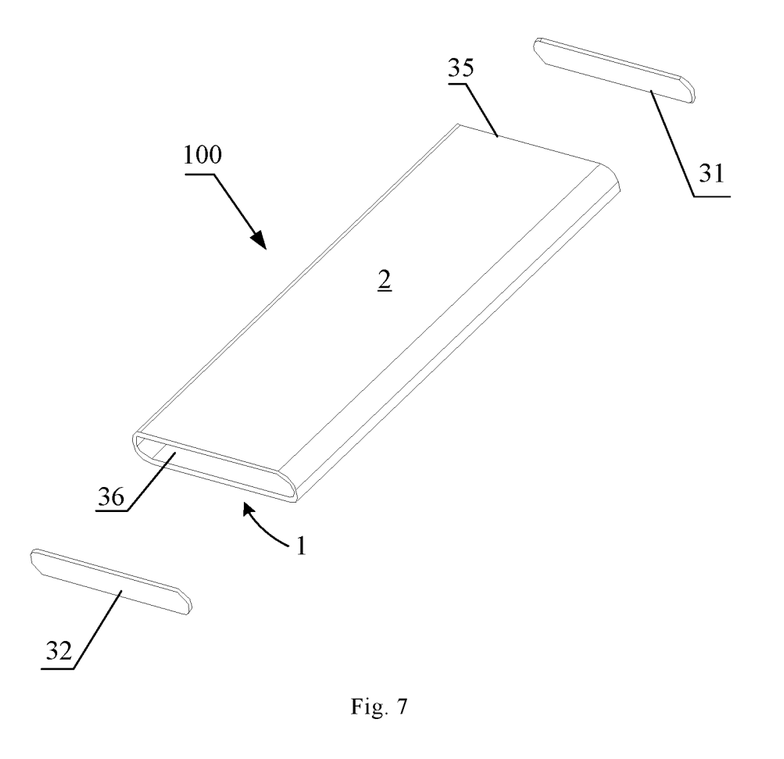
FIG. 7 is a perspective view of a mobile device according to an exemplary embodiment.

For example, as shown in FIG. 7, the mobile device may include a first auxiliary display module 31 and a second auxiliary display module 32. The first auxiliary display module 31 cooperates with the primary display module 2 at the top end face 35 of the mobile device 100, and forms a corresponding first closed structure. Moreover, the second auxiliary display module 32 cooperates with the primary display module 2 at the bottom end face 36 of the mobile device 100, and forms a corresponding second closed structure.

Alternatively or additionally, at least one of the first auxiliary display module 31 and the second auxiliary display module 32 may be part of the frame assembly 1. For example, the frame assembly 1 may include the first auxiliary display module 31 so that the two parts cannot be disassembled without breaking either part.

The solutions of the embodiments of the disclosure have the following advantageous effects. The primary display module wraps around a front surface, a back surface, and side surfaces of the mobile device, such that the dimension of the display screen is no longer limited to the front surface of the mobile device so the dimension specification of the front surface is no longer a limitation, thus the user can enjoy visual effect on a greater dimension, and achieve a better experience.

It would be easy for those skilled in the art to think of other implementations of the disclosure by taking the description and practicing the disclosure into account. The application is intended to cover any variations, usages, or modifications of the disclosure which are consistent with the general principle of the disclosure, and includes the common knowledge or customary means in the art. The embodiments and the description are merely illustrative, and the true scope and spirit of the disclosure should only be defined by the following claims.

It would be appreciated, the disclosure is not limited to the specific structures described above and illustrated in the drawings, and various modifications and changes may be formed without deviating the scope of the disclosure. The scope of the disclosure is only limited by the following appended claims.

What is claimed is:

1. A mobile device, comprising:
   a frame assembly with an accommodating space formed therein for disposing functional parts of the mobile device;
   a primary display module disposed on an outer side of the frame assembly, wherein the primary display module wraps around a front surface, a back surface, and side surfaces of the mobile device;
   a first auxiliary display module attached to a top end face of the mobile device, and sized to cooperate with the primary display module to form a partially closed structure; and
   a second auxiliary display module attached to a bottom end face of the mobile device, and sized to cooperate with the partially closed structure to form a closed structure,
   wherein the primary display module comprises a first flexible display module and a second flexible display module, the first flexible display module comprising a first curved portion and the second flexible display module comprising a second curved portion,
   wherein the first curved edge of the first flexible display module are connected to the second curved edge of the second flexible display module to form a partially closed display structure when the primary display module is mounted in the mobile device; and
   wherein the first curved portion ends in a first curved edge and the second curved portion ends in a second curved edge.

2. The mobile device according to claim 1, wherein the primary display module comprises a display module with a partially closed display structure.

3. The mobile device according to claim 1, wherein the primary display module comprises a display module with an integrated flexible flat structure; and
   wherein edges on both sides of the primary display module are connected to each other to form a partially closed display structure when the display module is mounted in the mobile device.

4. The mobile device according to claim 3, wherein a connection gap of the partially closed display structure is disposed at a side surface of the mobile device.

5. The mobile device according to claim 1, wherein a connection gap between the first flexible display module and the second flexible display module is located between the first curved edge and the second curved edge on one of two side surfaces.

6. The mobile device according to claim 5, wherein the first flexible display module and the second flexible display module are symmetrical to each other over a line connected between the two connection gaps on two curved side surfaces.

7. The mobile device according to claim 1, wherein the first flexible display module and the second flexible display module are wrapped on the outer side of the frame assembly according to an external wall structure of the frame assembly.

8. A housing structure, comprising:
   a frame assembly including circuitry parts disposed thereon;
   a primary display module disposed on an outer side of the frame assembly, wherein the primary display module wraps around the frame assembly; and an a first auxiliary display module disposed on a first end face of the frame assembly and a second auxiliary display module disposed on at least one a second end face of the frame assembly, wherein the first and second auxiliary display modules cooperate with the primary display module to form a closed structure that fully covers a mobile device;

wherein the primary display module comprises a first flexible display module and a second flexible display module, the first flexible display module comprising a first curved portion and the second flexible display module comprising a second curved portion, and wherein the first curved portion ends in a first curved edge and the second curved portion ends in a second curved edge.

9. The housing structure according to claim 8, wherein the primary display module comprises a display module with an integrated partially closed display structure.

10. The housing structure according to claim 9, wherein the partially closed display structure comprises a continuous surface having parallel portions positioned across a front side and a back side of the frame assembly and curved portions positioned between the front side and the back side.

11. The housing structure according to claim 8, wherein the primary display module comprises a display module with an integrated flexible flat structure; and wherein edges on both sides of the primary display module are connected to each other to form a partially closed display structure when the display module is mounted in a mobile device.

12. The housing structure according to claim 11, wherein a connection gap of the partially closed display structure is disposed at a side surface of the mobile device.

13. The housing structure according to claim 8, wherein the first curved edge of the first flexible display module are connected to the first curved edge of the second flexible display module to form a partially closed display structure when the primary display module is mounted in a mobile device.

14. The housing structure according to claim 13, wherein a connection gap between the first flexible display module and the second flexible display module is located at each of two side surfaces of the mobile device next to one or more of the first curved portion and the second curved portion.

* * * * *